(12) United States Patent
Yang et al.

(10) Patent No.: US 8,509,559 B2
(45) Date of Patent: Aug. 13, 2013

(54) HIERARCHICAL MOTION DEBLURRING METHOD FOR SINGLE IMAGE

(75) Inventors: Hao-Liang Yang, Pingtung County (TW); Po-Hao Huang, Kaohsiung County (TW); Shang-Hong Lai, Hsinchu (TW); Chih-Chih Huang, Hsinchu County (TW); Shu-Han Yu, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 280 days.

(21) Appl. No.: 13/046,787

(22) Filed: Mar. 14, 2011

(65) Prior Publication Data
US 2011/0229044 A1    Sep. 22, 2011

(30) Foreign Application Priority Data
Mar. 16, 2010  (TW) ................................ 99107632 A (51) Int. Cl.
*G06T 5/001* (2006.01)
*G06T 5/50* (2006.01)
*G06K 9/6202* (2006.01)

(52) U.S. Cl.
USPC ........... 382/255; 382/219; 382/254; 382/260; 382/264; 382/274; 348/345

(58) Field of Classification Search
CPC ......... G06K 9/3202; G06T 5/001; G06T 5/50
USPC ................ 382/219, 254, 255, 260, 264, 274, 382/275; 348/345
See application file for complete search history.

(56) References Cited

U.S. PATENT DOCUMENTS

| 8,139,884 B2 * | 3/2012 | Chien et al. .................. 382/255 |
| 2008/0025627 A1 | 1/2008 | Freeman et al. |
| 2008/0240607 A1 | 10/2008 | Sun et al. |
| 2010/0027686 A1 | 2/2010 | Zuo et al. |

FOREIGN PATENT DOCUMENTS

| CN | 1728181 | 2/2006 |
| CN | 101364302 | 2/2009 |
| EP | 2082332 | 7/2009 |
| EP | 1356421 | 12/2009 |
| TW | 200945215 | 11/2009 |

OTHER PUBLICATIONS

"First Office Action of China Counterpart Application", issued on Aug. 28, 2012, p. 1-p. 5. Anonymous ICCV Submission, "Hierarchical Motion Deblurring from a Single Image", appears in ICCV 2009 submission 1094. Confidential Review Copy, issued on 2009, p. 1-p. 8.
Yuan et al., "Image Deblurring with Blurred/Noisy Image Pairs," ACM Transactions on Graphics 26 (3), Jul. 2007, pp. 1-9.

* cited by examiner

*Primary Examiner* — Mathew Bella
*Assistant Examiner* — Jose M Torres
(74) *Attorney, Agent, or Firm* — Jianq Chyun IP Office (57) ABSTRACT

A hierarchical motion deblurring method for a single image is provided. In the method, a blur kernel of a target image is calculated and a multi-scale representation for representing the target image and the blur kernel is constructed. Then, a gradient attenuation function and a strong edge suppression function are applied to a residual Richardson-Lucy algorithm, so as to iteratively calculate a residual image between the blur kernel and the target image represented by the representation in each scale and restore the residual image to obtain a first restored image and a second restored image. Finally, the two restored images are compared so as to obtain a motion deblurring image.

10 Claims, 4 Drawing Sheets

HIERARCHICAL MOTION DEBLURRING METHOD FOR SINGLE IMAGE

CROSS-REFERENCE TO RELATED APPLICATION

This application claims the priority benefit of Taiwan application serial no. 99107632, filed on Mar. 16, 2010. The entirety of the above-mentioned patent application is hereby incorporated by reference herein and made a part of this specification.

BACKGROUND OF THE INVENTION

1. Field of the Invention

The invention relates to an image processing method, and more particularly, to a hierarchical motion deblurring method for a single image.

2. Description of Related Art

Motion blur is caused by relative motion between the camera and the scene within the exposure time period. This problem frequently occurs when taking photographs under low-light conditions using a hand-held camera. Another type of motion blur is caused by a moving object captured with a static camera.

For images degraded by the motion blur, restoring the images is a long-standing research problem in computer vision and image processing. Currently, a number of algorithms have been proposed to tackle this problem and they can be roughly classified into three groups: single-image deblurring, multiple-image deblurring, and computational photography.

Herein, the real camera motion is usually too complicated to estimate from a blurred image when it involves camera rotation or large scene depth variations. To simplify the problem formulation, previous researches usually assumed the camera motion to be perpendicular to the optical axes and the effect of scene depth variation can be neglected. In other words, the blur kernel, or named point spread function (PSF), is assumed to be spatially invariant. Under this assumption, a blurred image B, can be modeled as the convolution of the clear image I, and the blur kernel, f, as given in the following:

$$B = I \otimes f + n \quad (1)$$

where n is the additive noise.

If both I and f are unknowns, to solve equation (1) is a blind deconvolution problem. Even with the spatially-invariant assumption with the kernel, the problem is still an ill-posed one, because I and f are highly under-constrained and there are many possible combinations of I and f that can be convolved to be equal to the blurred image B.

SUMMARY OF THE INVENTION

Accordingly, an embodiment of the invention provides a hierarchical motion deblurring method for a single image, in which a gradient attenuation function and a strong edge suppressing function are used to define a weight matrix, which is then applied to a Richardson-Lucy (RL) algorithm, thereby suppressing the ringing artifacts.

An embodiment of the invention provides a hierarchical motion deblurring method for a single image. The method includes following steps: a. providing a target image; b. calculating a blur kernel of the target image; c. constructing a multi-scale representation for representing the target image and the blur kernel; d. from a coarse scale to a fine scale iteratively calculating a residual image between the target image and the blur kernel represented by the multi-scale representation in each scale, and restoring the residual image to obtain a first restored image by using a residual RL algorithm, wherein in the iteration, the residual image is multiplied by a first weight matrix defined by a first gradient attenuation function; e. from the coarse scale to the fine scale iteratively calculating the residual image between the target image and the blur kernel represented by the multi-scale representation in each scale, and restoring the residual image to obtain a second restored image by using the residual RL algorithm, wherein in the iteration, the residual image is multiplied by a second weight matrix defined by a second gradient attenuation function and a strong edge suppressing function; and f. comparing the first and the second restored images so as to obtain a motion deblurring restored image.

In an embodiment of the invention, step d includes following steps: d1. calculating a restored image between the target image and the blur kernel represented by the multi-scale representation in a coarsest scale by using a standard RL algorithm; d2. calculating the first gradient attenuation function according to the calculated restored image, so as to define the first weight matrix; d3. upsampling the calculated restored image to a next scale of a current scale so as to form a guide image in the next scale, and upsampling the calculated first gradient attenuation function and first weight matrix so as to be used in the next scale; d4. subtracting a convolution of the guide image in the next scale and a blur kernel of the guide image in the next scale from the target image represented by the multi-scale representation in the next scale to obtain a residual target image in the next scale; d5. calculating the residual image of the residual target image by using the residual RL algorithm, and multiplying the calculated residual image by the first weight matrix upsampled in a previous scale; d6. adding the calculated residual image to the guide image to obtain the restored image in the next scale; and d7. repeating the above steps d2-d6 to, from the coarse scale to the fine scale, iteratively calculate the residual image between the target image and the blur kernel represented by the multi-scale representation in other scales, and using the finally calculated residual image as the first restored image.

In an embodiment of the invention, step d2 includes following steps: calculating a gradient distribution of the restored image to generate a scaling factor; multiplying the scaling factor by the first gradient attenuation function in the previous scale so as to update the first gradient attenuation function; and defining the first weight matrix by using the updated first gradient attenuation function.

In an embodiment of the invention, before step d3, the method further includes a step of filtering a ringing artifact of the calculated restored image by using a bilateral filter.

In an embodiment of the invention, step e includes following steps: e1. calculating a restored image between the target image and the blur kernel represented by the multi-scale representation in a coarsest scale by a standard RL algorithm; e2. calculating the second gradient attenuation function according to the calculated restored image so as to define the second weight matrix; e3. applying the second weight matrix to the strong edge suppressing function to update the second weight matrix; e4. upsampling the calculated restored image to a next scale of a current scale to form a guide image in the next scale, and upsampling the second gradient attenuation function and the second weight matrix so as to be used in the next scale; e5. subtracting a convolution of the guide image in the next scale and a blur kernel of the guide image in the next scale from the target image represented by the multi-scale representation in the next scale to obtain a residual target image in the next scale; e6. calculating the residual image of the residual target image by using the residual RL algorithm, and multiplying the residual image by the second weight matrix upsampled in a previous scale; e7. adding the calculated residual image to the guide image to obtain the restored image in the next scale; and e8. repeating the above steps e2-e7 to, from the coarse scale to the fine scale, iteratively calculate the residual image between the target image and the blur kernel represented by the multi-scale representation in other scales, and using the finally calculated residual image as the second restored image.

In an embodiment of the invention, step e2 includes following steps: calculating a gradient distribution of the restored image to generate a scaling factor; multiplying the scaling factor by the second gradient attenuation function in a previous scale to update the second gradient attenuation function; and defining the second weight matrix by the updated second gradient attenuation function.

In an embodiment of the invention, before step e3, the method further includes a step of filtering a ringing artifact of the calculated restored image by using a bilateral filter.

In an embodiment of the invention, step f includes following steps: f1. calculating a difference image of the first and the second restored images; f2. filtering a ringing artifact of the difference image by using a bilateral filter; f3. calculating a scaling factor of the ringing artifact occupying the difference image by using a least mean square method; and f4. calculating the final restored image according to the second restored image, the difference image, and a product of the ringing artifact and the scaling factor.

In an embodiment of the invention, the final restored image is obtained by adding the difference image to the second restored image, and further subtracting the product of the ringing artifact and the scaling factor from the second restored image.

In an embodiment of the invention, the strong edge suppressing function is a Gompertz function.

Based on the above, in the hierarchical motion deblurring method for a single image of the present invention, a weight matrix is applied to a RL algorithm, and the weights in the weight matrix are respectively defined by a gradient attenuation function and a strong edge suppressing function. Accordingly, an update ratio of the iteration can be controlled, so as to suppress the ringing artifacts.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides a gradient attenuation Richardson-Lucy algorithm (GARL), which applies gradient information to suppress ringing artifacts. Furthermore, the present invention adopts a hierarchical restoration scheme, and accordingly adopts a concept of residual deconvolution to moderate the ringing artifacts. Embodiments are provided hereinafter to elaborate the hierarchical motion deblurring method of the invention.

The concept of residual RL deconvolution is to perform a RL algorithm on the residual image so as to reduce the absolute amplitudes of the signals, hence reducing the ringing artifacts. The residual image $\Delta I$ is the difference of a clear image $I$ and a guide image $I_g$, as given in the following:

$$I = I_g + \Delta I \tag{2}$$

Substituting equation (2) into equation (1), we have:

$$\Delta B = \Delta I \otimes f + n \tag{3}$$

where $\Delta B = B - I_g \otimes f$ an $\Delta B$ is a residual blurred image.

Assuming the noise n follows a Poisson distribution, the standard RL algorithm is modified as follows:

$$\Delta \hat{I}^{t+1} = \Delta \hat{I}^t \cdot \left( f * \frac{\Delta \hat{B}^t}{\Delta \hat{I}^t \otimes f} \right) \tag{4}$$

where '*' is a correlation operator, and 't' indicates an iteration number. Furthermore, $\hat{I} = I + \mu$ with $\mu$ denoting an offset used to enforce the non-negativity of every pixel value.

Based on the above, in the hierarchical motion deblurring method of the invention, a multi-scale representation of the blurred image is first constructed, and the residual RL scheme is adopted. Herein, the guide image in the coarsest scale is obtained directly through the standard RL algorithm. By applying a fast approximated bilateral filter to every scale except the last one, the ringing artifacts can be prevented from being propagated to the next scale.

Because the RL deconvolution algorithm is a ratio-based algorithm, the ringing artifacts are suppressed by controlling the update ratio of iteration in the invention. Accordingly, in one embodiment of the invention, an additional weight matrix is multiplied in the residual RL algorithm at each scale and equation (4) is modified as follows:

$$\Delta \hat{I}_s^{t+1} = W_{s-1} \cdot \left[ \Delta \hat{I}_s^t \cdot \left( f_s * \frac{\Delta \hat{B}_s^t}{\Delta \hat{I}_s^t \otimes f_s} \right) \right] \tag{5}$$

where $W_{s-1}$ is the weight matrix and s indexes the scale.

It should be noted that, the ringing artifacts have three main properties. First, the ringing artifacts are more obvious in homogeneous regions than in complex texture regions. Second, the ringing artifacts are severer around the strong edges than in other regions. Third, the ringing artifacts usually propagate along a kernel direction.

According to these properties, the gradient attenuation function is exploited to determine the weight for each pixel. In order to make the gradient attenuation function decrease the update ratio in low gradient regions so as to expand the suppression of ringing artifacts, in one embodiment of the invention, a scaling factor is defined as follows:

$$\varphi = \left( \frac{\|\nabla I_s\|}{\alpha} \right)^{1-\beta} \tag{6}$$

where α determines the level of gradient magnitudes to remain unchanged, and β controls the attenuation scale.

In the hierarchical restoration scheme of the invention, the gradient attenuation function Φ is re-computed at each scale φ by propagating the scaling factor from the coarsest scale to the finest scale as follows:

$$\Phi_0 = \phi_0$$

$$\Phi_s = \Phi_{s-1} \cdot \phi_s \quad (7)$$

Finally, the gradient attenuation function Φ is determined by the strengths of all the edges and details.

The gradient attenuation function Φ in equation (7) can be normalized by dividing it by the maximal value of the gradient attenuation function Φ at each scale and then rooted by a value smaller than 1. The resulting gradient attenuation function Φ can be used as a weighting map so as to significantly suppress most ringing artifacts. However, it sometimes fails to suppress the ringing artifacts around the region of strong edges. To resolve this problem, an embodiment of the invention provides an enhance GARL algorithm, which incorporates a strong edge suppressing function (e.g. Gompertz function) to further attenuate the update ratio around very strong edge. According to the third property of ringing artifacts, in one embodiment of the invention, the attenuating range is diffused by the estimated blur kernel. The enhanced weighting map is thus defined as follows:

$$E = \exp(-\exp(-\eta \cdot (\Phi - \omega))) \otimes f$$

$$\Phi' = \Phi^{(\gamma \cdot E + \kappa)} \quad (8)$$

where parameters η and ω control the shape of Gompertz function, E is an image that indicates the positions of strong edges and their influence range according to the estimated blur kernel, and parameters κ and γ control the attenuating scale around the strong edges.

To sum up, in the GARL algorithm of the invention, the concept of suppressing the ringing artifacts of RL by multiplying a weight matrix is similar to that proposed in the conventional RL algorithm. However, the ways of determining the weight are quite different.

When the restored images are obtained through the GARL algorithm and the enhanced GARL algorithm, the difference image Diff between them contain the details and ringing artifacts:

$$\text{Diff} = I_{GARL} - I_{EGARL} = I_D + \lambda I_R, \quad (9)$$

where $I_{GARL}$ and $I_{EGARL}$ denote the restored images by the GARL algorithm and the enhanced GARL algorithm, respectively; $I_D$ and $I_R$ indicate the detail and ringing layer, respectively; and λ is a scale factor. $I_R$ is extracted by applying a bilateral filter to the difference image Diff and λ is determined as follows:

$$\arg\min_{\lambda} \|\text{Diff} - \lambda I_R\|_2^2 \quad (10)$$

Thus, the final restored image $I_F$ is computed as follows:

$$I_F = I_{EGARL} + \text{Diff} \lambda I_R \quad (11)$$

Accordingly, the obtained final restored image $I_F$ is a motion deblurring restored image. Based on aforesaid theory, the invention defines an entire set of method and flow to achieve the objective of hierarchical motion deblurring. Embodiments are described below for further illustration.

Figure 1:
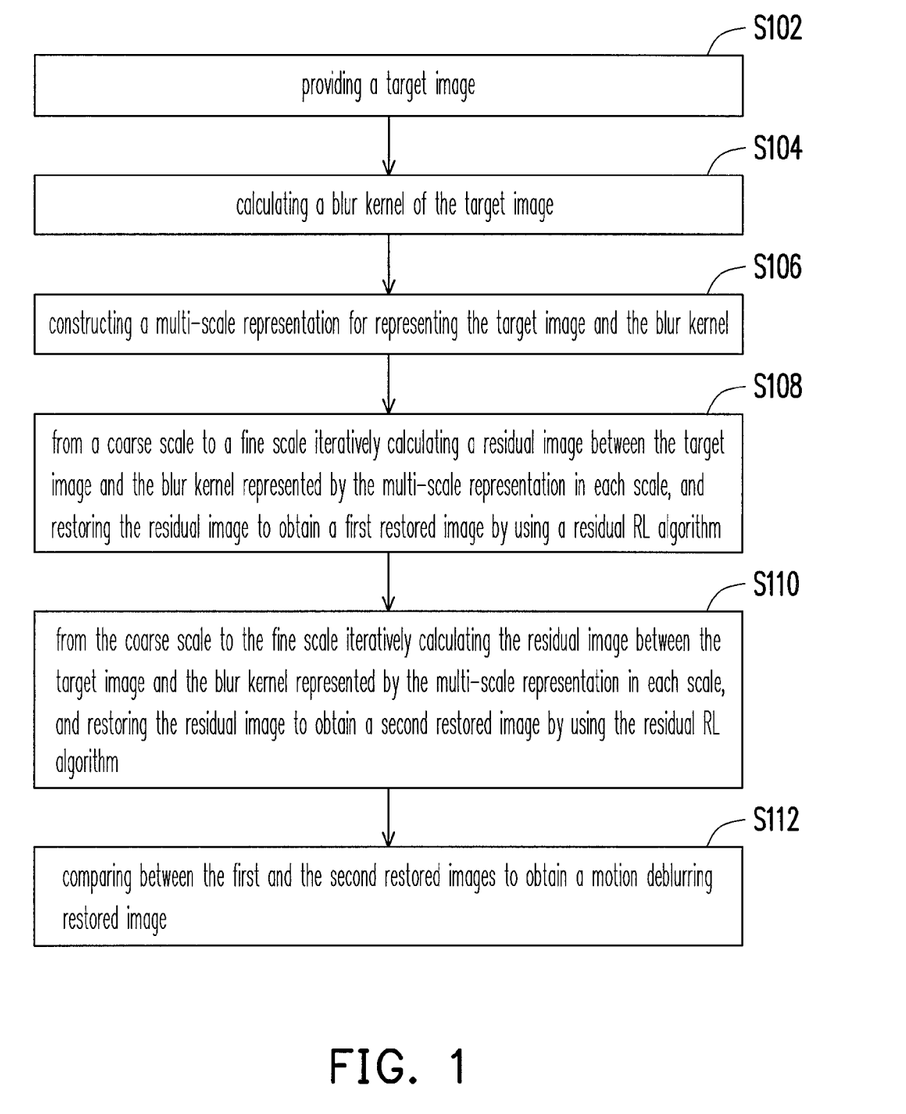
FIG. 1 is a flowchart of a hierarchical motion deblurring method for a single image according to an embodiment of the invention.

FIG. 1 is a flowchart of a hierarchical motion deblurring method for a single image according to an embodiment of the invention. Referring to FIG. 1, the hierarchical motion deblurring method of the present embodiment is adapted to process a single image, and by the iteration of the residual RL algorithm, the ringing artifacts can be suppressed. The steps of the method are described as follows.

First, a target image is provided (step S102). Next, a blur kernel of the target image is calculated (step S104), and the target image and the blur kernel are represented by a multi-scale representation (step S106). Herein, in the present embodiment, the guide image in the coarsest scale is calculated by using a standard RL algorithm, and by applying a fast approximated bilateral filter to every scale except the last one, the ringing artifacts can be prevented from being propagated to a next scale.

After the multi-scale representation of the target image and the blur kernel is obtained, the above GARL algorithm is adopted to, from a coarse scale to a fine scale, iteratively calculate a residual image between the target image and the blur kernel represented by the multi-scale representation in each scale, and the residual image is restored to obtain a first restored image (step S108).

It should be noted that, in the present embodiment, when the iteration of the GARL algorithm is performed, the residual image is multiplied by a first weight matrix defined by a first gradient attenuation function, so as to reduce the update ratio of iteration, thereby suppressing the ringing artifacts.

Figure 2:
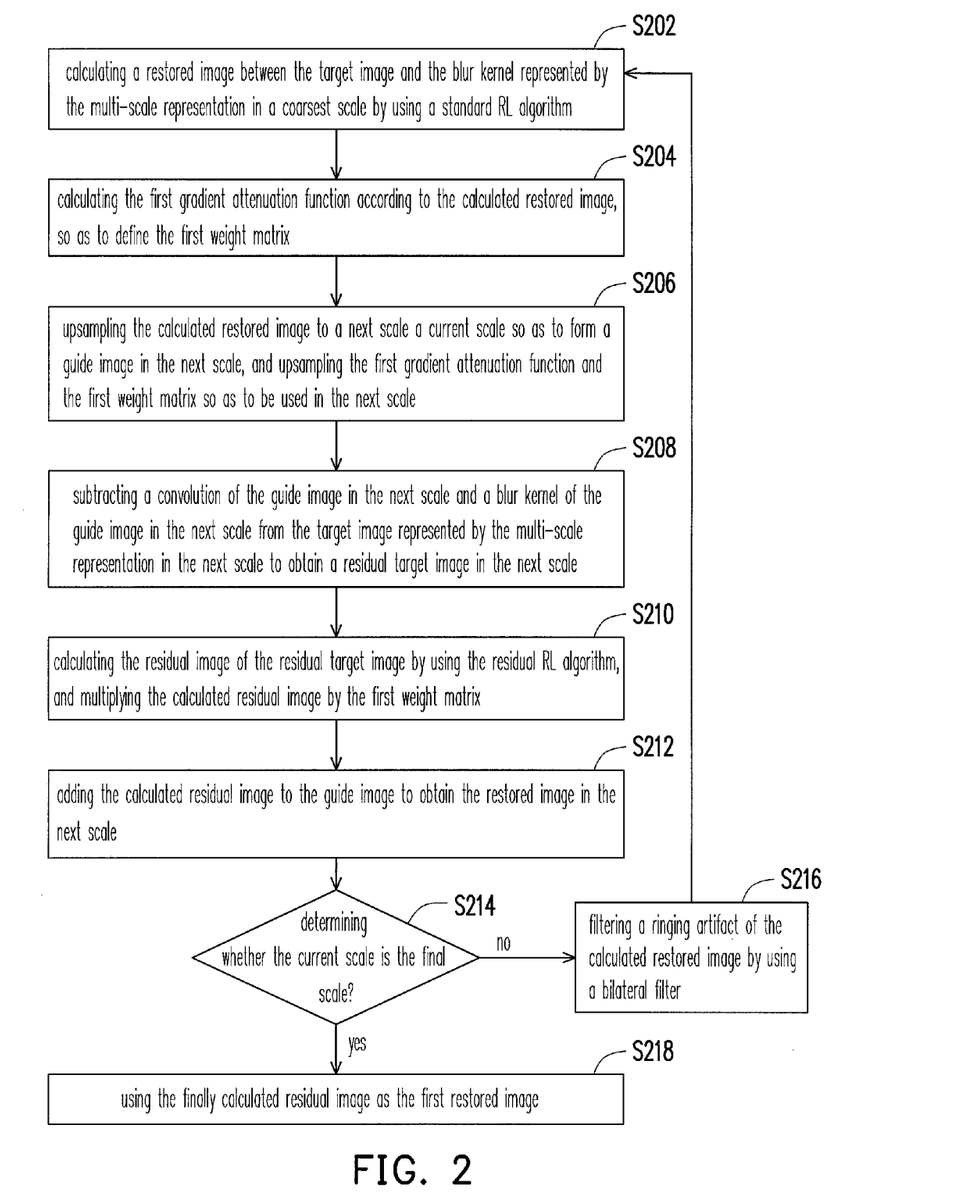
FIG. 2 is a flowchart of the GARL algorithm according to an embodiment of the invention.

Specifically, FIG. 2 is a flowchart of the GARL algorithm according to an embodiment of the invention. Referring to FIG. 2, in the GARL algorithm of the present embodiment, a restored image between the target image and the blur kernel represented by the multi-scale representation in a coarsest scale is first calculated by using a standard RL algorithm (step S202).

Thereafter, according to the calculated restored image, the first gradient attenuation function is calculated and used to define the first weight matrix (step S204). Herein, in the present embodiment, a gradient distribution of the restored image is first calculated so as to generate a scaling factor (referring to equation (6)), and then the scaling factor is multiplied by the first gradient attenuation function in a previous scale so as to update the first gradient attenuation function (referring to equation (7)). Finally, the first weight matrix is defined by the updated first gradient attenuation function.

Next, the restored image obtained in step S202 is upsampled to a next scale of a current scale to form a guide image in the next scale (step S206), meanwhile "the first gradient attenuation function" and "the first weight matrix" are also upsampled so as to be used in the next scale. By subtracting a convolution of the guide image in the next scale and a blur kernel of the guide image in the next scale from the target image represented by the multi-scale representation in the next scale (i.e. $\Delta B = B - I_g \otimes f$), a residual target image in the next scale is obtained (step S208).

Next, by using the residual RL algorithm, the residual image of the residual target image is calculated, and multiplied by the first weight matrix (step S210). Finally, the calculated residual image is added to the guide image to obtain the restored image in the next scale (step S212).

By the above steps, the restored image in the next scale can be obtained from the restored image in the coarsest scale, and in one embodiment of the invention, the residual image between the target image and the blur kernel represented by the multi-scale representation in other scales is iteratively calculated from the coarse scale to the fine scale. Accordingly, each time the residual image is calculated, whether the currently processed image scale is the final scale is determined (step S214).

Herein, if it is determined that the currently processed image scale is not the final scale, a ringing artifact of the calculated restored image is filtered by using a bilateral filter (step S216). Specifically, in the present embodiment, a fast approximated bilateral filter is applied to every scale except the last one, such that the ringing artifacts can be prevented from being propagated to the next scale. After the ringing artifacts are filtered, the flow returns to step S204, and steps S204-S212 are repeated to continuously calculate the restored images in other scales.

On the contrary, in step S214, if it is determined that the currently processed image scale is the final scale, the finally calculated residual image is used as the first restored image obtained by performing the GARL algorithm (step S218).

Returning to step S106 in FIG. 1, after the multi-scale representation representing the target image and the blur kernel is constructed, in the present embodiment, the aforesaid enhanced GARL algorithm is further used to, from the coarse scale to the fine scale, iteratively calculate a residual image between the target image and the blur kernel represented by the multi-scale representation in each scale, and restore the residual image to obtain a second restored image (step S110). Herein, step S110 can be performed along with step S108 or can be performed before or after step S108, which is not limited in the embodiment.

It should be noted that, in the iteration of the enhanced GARL algorithm in the embodiment, the residual image is multiplied by a second weight matrix defined by a second gradient attenuation function, so as to reduce the update ratio of the iteration, thereby suppressing the ringing artifacts.

Figure 3:
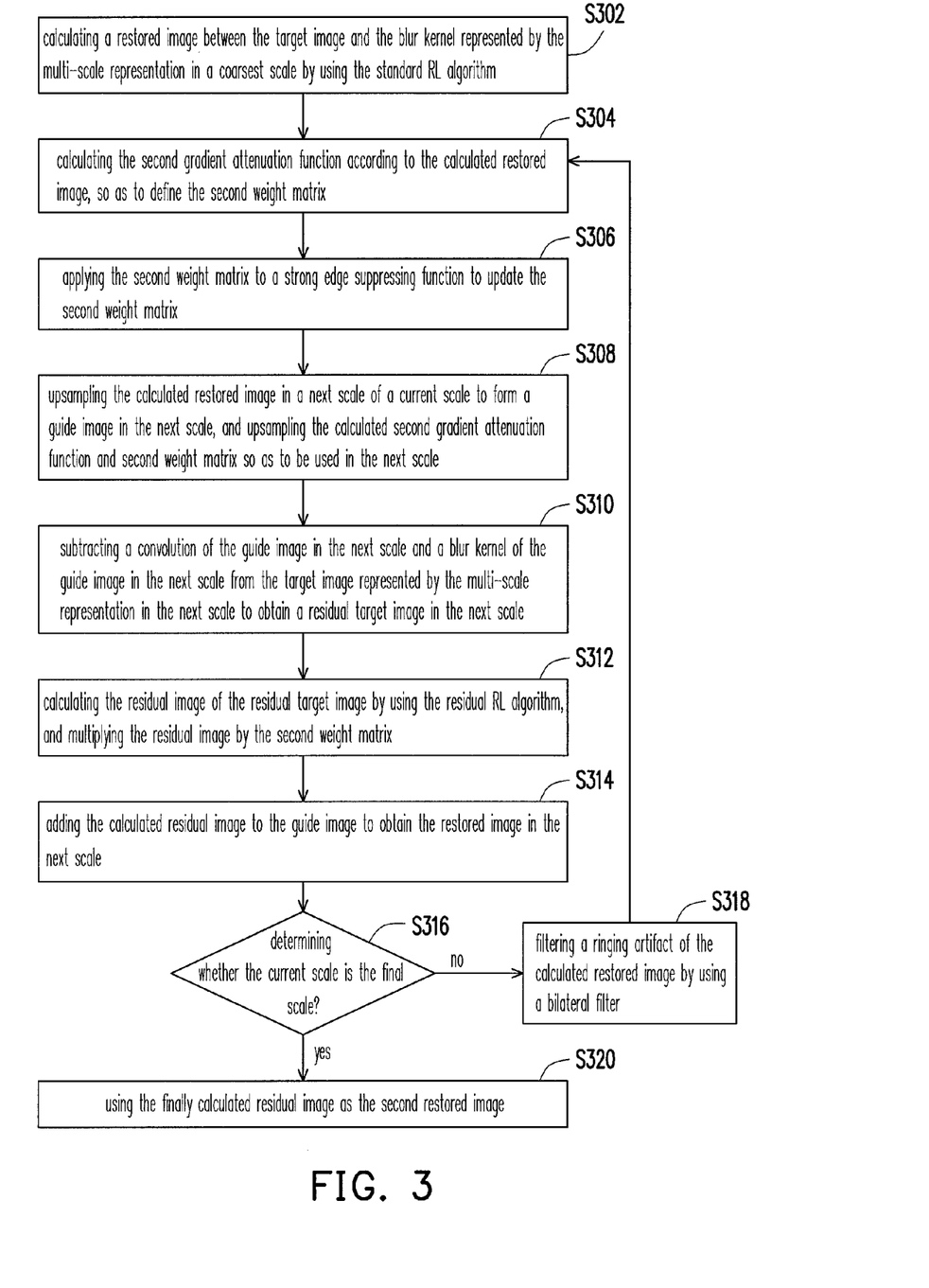
FIG. 3 is a flowchart of the enhanced GARL algorithm according to an embodiment of the invention.

Specifically, FIG. 3 is a flowchart of the enhanced GARL algorithm according to an embodiment of the invention. Referring to FIG. 3, in the enhanced GARL algorithm of the present embodiment, a restored image between the target image and the blur kernel represented by the multi-scale representation in the coarsest scale is first calculated by using the standard RL algorithm (step S302).

Thereafter, according to the calculated restored image, a second gradient attenuation function is calculated and used to define the second weight matrix (step S304). Herein, in the present embodiment, the gradient distribution of the restored image is first calculated so as to generate a scaling factor (referring to equation (6)), and then the scaling factor is multiplied by the second gradient attenuation function in a previous scale so as to update the second gradient attenuation function (referring to equation (7)). Finally, the second weight matrix is defined by the updated second gradient attenuation function.

Different from the GARL algorithm, in the enhanced GARL algorithm, the second weight matrix is not only defined by the second gradient attenuation function, but further applied to a strong edge suppressing function (referring to equation (8)), so as to be updated (step S306).

Next, the restored image calculated in step S302 is upsampled to a next scale of a current scale to form a guide image in the next scale (step S308), meanwhile "the second gradient attenuation function" and "the second weight matrix" are also upsampled so as to be used in the next scale. By subtracting a convolution of the guide image in the next scale and a blur kernel of the guide image in the next scale from the target image represented by the multi-scale representation in the next scale (i.e. $\Delta B = B - I_g \otimes f$), a residual target image in the next scale is obtained (step S310).

Next, by using the residual RL algorithm, the residual image of the residual target image is calculated, and the residual image is multiplied by the second weight matrix (step S312). Finally, the calculated residual image is added to the guide image to obtain the restored image in the next scale (step S314).

By the above steps, the restored image in the next scale can be obtained from the restored image in the coarsest scale, and in one embodiment of the invention, the residual image between the target image and the blur kernel represented by the multi-scale representation in other scales is iteratively calculated from the coarse scale to the fine scale. Accordingly, each time the residual image is calculated, whether the currently processed image scale is the final scale is determined (step S316).

Herein, if it is determined that the currently processed image scale is not the final scale, a ringing artifact of the calculated restored image is filtered by using the bilateral filter (step S318). Specifically, in the present embodiment, a fast approximated bilateral filter is applied to every scale except the last one, such that the ringing artifacts can be prevented from being propagated to the next scale. After the ringing artifacts are filtered, the flow returns to step S304, and steps S304-S314 are repeated to continuously calculate the restored images in other scales.

On the contrary, in step S316, if it is determined that the currently processed image scale is the final scale, the finally calculated residual image is used as the second restored image obtained by performing the enhanced GARL algorithm (step S320).

Returning to step S110 in FIG. 1, by using the GARL algorithm and the enhanced GARL algorithm, the first and the second restored images can be correspondingly obtained in the present embodiment, and then the first and the second restored images are compared so as to obtain a motion deblurring restored image (step S112).

Figure 4:
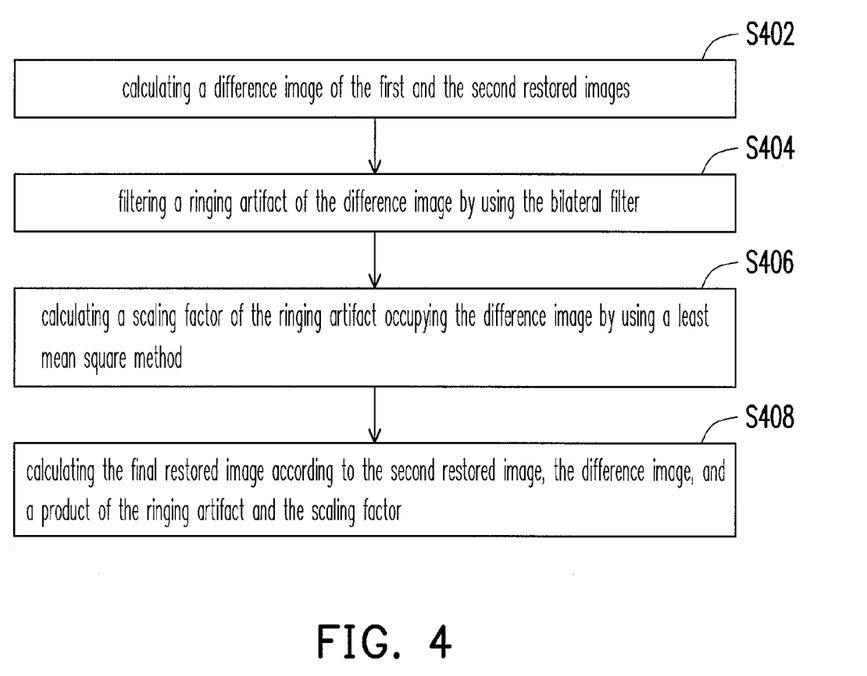
FIG. 4 is a flowchart of a method for calculating the final restored image according to an embodiment of the invention.

Specifically, FIG. 4 is a flowchart of a method for calculating the final restored image according to an embodiment of the invention. Referring to FIG. 4, in the present embodiment, the first restored image calculated by using the GARL algorithm and the second restored image calculated by using the enhanced GARL algorithm are compared, so as to obtain the motion deblurring restored image, and the steps are as follows.

First, a difference image of the first and the second restored images is calculated (step S402), in which the difference image corresponds to Diff in equation (9).

Next, a ringing artifact of the difference image is filtered by using a bilateral filter (step S404), which corresponds to equation (10).

Thereafter, a scaling factor of the ringing artifact occupying the difference image is calculated by using a least mean square method, in which the scaling factor corresponds to λ in equation (9).

Finally, a final restored image is calculated according to the second restored image, the difference image, and a product of the ringing artifact and the scaling factor. In detail, the second restored image is added by the difference image, and then subtracted by a product of the ringing artifact and the scaling factor. Accordingly, the calculation result can serve as the final restored image, and the step corresponds to equation (11).

To sum up, in the hierarchical motion deblurring method for a single image of the invention, a weight matrix is applied to the RL algorithm, an update ratio of the iteration is controlled by using a gradient attenuation function, and an attenuating scale around the strong edges is suppressed by using a strong edge suppressing function. Accordingly, the ringing artifacts can be suppressed and the motion deblurring can be achieved.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A hierarchical motion deblurring method for a single image, comprising:
   a. providing a target image;
   b. calculating a blur kernel of the target image;
   c. constructing a multi-scale representation for representing the target image and the blur kernel;
   d. from a coarse scale to a fine scale iteratively calculating a residual image between the target image and the blur kernel represented by the multi-scale representation in each scale, and restoring the residual image to obtain a first restored image by using a residual Richardson-Lucy (RL) algorithm, wherein in the iteration, the residual image is multiplied by a first weight matrix defined by a first gradient attenuation function;
   e. from the coarse scale to the fine scale iteratively calculating the residual image between the target image and the blur kernel represented by the multi-scale representation in each scale, and restoring the residual image to obtain a second restored image by using the residual RL algorithm, wherein in the iteration, the residual image is multiplied by a second weight matrix defined by a second gradient attenuation function and a strong edge suppressing function; and
   f. comparing the first and the second restored images so as to obtain a motion deblurring restored image.

2. The method as claimed in claim 1, wherein step d comprises:
   d1. calculating a restored image between the target image and the blur kernel represented by the multi-scale representation in a coarsest scale by using a standard RL algorithm;
   d2. calculating the first gradient attenuation function according to the calculated restored image, so as to define the first weight matrix;
   d3. upsampling the calculated restored image to a next scale of a current scale so as to form a guide image in the next scale, and upsampling the calculated first gradient attenuation function and first weight matrix so as to be used in the next scale;
   d4. subtracting a convolution of the guide image in the next scale and a blur kernel of the guide image in the next scale from the target image represented by the multi-scale representation in the next scale to obtain a residual target image in the next scale;
   d5. calculating the residual image of the residual target image by using the residual RL algorithm, and multiplying the calculated residual image by the first weight matrix upsampled in a previous scale;
   d6. adding the calculated residual image to the guide image to obtain the restored image in the next scale; and
   d7. repeating the above steps d2-d6 to, from the coarse scale to the fine scale iteratively calculate the residual image between the target image and the blur kernel represented by the multi-scale representation in other scales, and using the finally calculated residual image as the first restored image.

3. The method as claimed in claim 2, wherein step d2 comprises:
   calculating a gradient distribution of the restored image to generate a scaling factor;
   multiplying the scaling factor by the first gradient attenuation function in the previous scale so as to update the first gradient attenuation function; and
   defining the first weight matrix by using the updated first gradient attenuation function.

4. The method as claimed in claim 2, wherein before step d3, the method further comprises:
   filtering a ringing artifact of the calculated restored image by using a bilateral filter.

5. The method as claimed in claim 1, wherein step e comprises:
   e1. calculating a restored image between the target image and the blur kernel represented by the multi-scale representation in a coarsest scale by using a standard RL algorithm;
   e2. calculating the second gradient attenuation function according to the calculated restored image, so as to define the second weight matrix;
   e3. applying the second weight matrix to the strong edge suppressing function to update the second weight matrix;
   e4. upsampling the calculated restored image to a next scale of a current scale to form a guide image in the next scale, and upsampling the calculated second gradient attenuation function and second weight matrix so as to be used in the next scale;
   e5. subtracting a convolution of the guide image in the next scale and a blur kernel of the guide image in the next scale from the target image represented by the multi-scale representation in the next scale to obtain a residual target image in the next scale;
   e6. calculating the residual image of the residual target image by using the residual RL algorithm, and multiplying the residual image by the second weight matrix upsampled in a previous scale;
   e7. adding the calculated residual image to the guide image to obtain the restored image in the next scale; and
   e8. repeating the above steps e2-e7 to, from the coarse scale to the fine scale, iteratively calculate the residual image between the target image and the blur kernel represented by the multi-scale representation in other scales and using the finally calculated residual image as the second restored image.

6. The method as claimed in claim 5, wherein step e2 comprises:
   calculating a gradient distribution of the restored image to generate a scaling factor;
   multiplying the scaling factor by the second gradient attenuation function in the previous scale to update the second gradient attenuation function; and
   defining the second weight matrix by the updated second gradient attenuation function.

7. The method as claimed in claim 5, wherein before step e3, the method further comprises:
   filtering a ringing artifact of the calculated restored image by using a bilateral filter.

8. The method as claimed in claim 1, wherein step f comprises:
   f1. calculating a difference image of the first and the second restored images;
   f2. filtering a ringing artifact of the difference image by using a bilateral filter;

f3. calculating a scaling factor of the ringing artifact occupying the difference image by using a least mean square method; and f4. calculating the final restored image according to the second restored image, the difference image, and a product of the ringing artifact and the scaling factor.

9. The method as claimed in claim 8, wherein in step f4, the final restored image is obtained by adding the difference image to the second restored image, and further subtracting the product of the ringing artifact and the scaling factor from the second restored image.

10. The method as claimed in claim 1, wherein the strong edge suppressing function is a Gompertz function.

\* \* \* \* \*